April 7, 1931.    C. P. DUBBS    1,799,218
HYDROCARBON OIL CONVERSION
Filed July 30, 1927
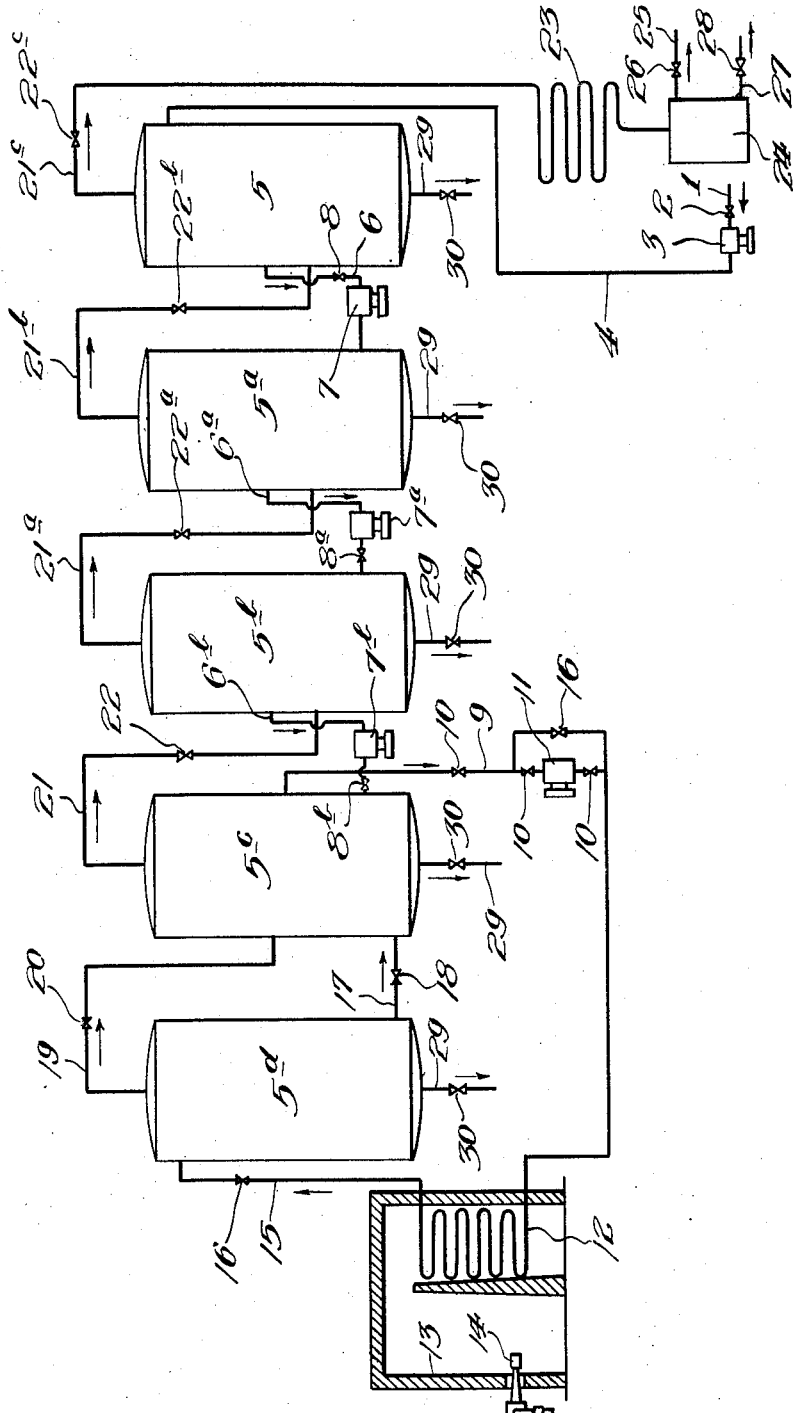
Witness:
Inventor:
Carbon P. Dubbs,
by Frank L. Belknap
Atty.

Patented Apr. 7, 1931

1,799,218

UNITED STATES PATENT OFFICE

CARBON P. DUBBS, OF WILMETTE, ILLINOIS, ASSIGNOR TO UNIVERSAL OIL PRODUCTS COMPANY, OF CHICAGO, ILLINOIS, A CORPORATION OF SOUTH DAKOTA

HYDROCARBON-OIL CONVERSION

Application filed July 30, 1927. Serial No. 209,630.

The present invention relates to hydrocarbon oil conversion, and refers more particularly to the subjection of hydrocarbon oils to conditions of cracking or conversion temperature, and superatmospheric pressure to produce therefrom high yields of useful low boiling point range hydrocarbons suitable for motor fuel and the like.

It is one of the objects of the present invention to produce a gasoline-like product suitable for motor fuel, possessing high anti-knock or anti-detonating properties.

It is another object of the invention to carry out the operation wherein hydrocarbon oil is adapted to be passed successively through zones wherein it is brought into physical relation with vapors progressing in an opposite direction, whereby efficient scrubbing and fractionation of the vapors and vaporization of the low boiling point fractions of the charging stock takes place, that is, vapors separated in a preceding zone are caused to pass successively through pools of liquid of cooler temperature on their way to the condenser and receiver, whereby repeated and prolonged fractionation is permitted, thus condensing substantially all of the undesirable heavy fractions and permitting the production of a final distillate which conforms to all of the commercial requirements for motor fuel.

The unvaporized portions of the charging stock, together with condensed portions of the vapors, are passed successively from zone to zone in a direction counter-current to the flow of the vapors, the temperature of which zones progressively increases. The unvaporized hydrocarbons in the last zone are removed and subjected to the action of heat in a furnace whereby they are raised to a desired cracking temperature.

Other objects of the invention are to provide a process and apparatus having a wide range of flexibility and being peculiarly adapted to efficient treatment of any character of charging stock, including heavy crudes, topped crudes, petroleum distillates and residue, and for the production of any desired types of products; to provide a process and apparatus in which the oil being treated may be fractionally distilled and subjected to a cracking or breaking up, and to a polymerization to convert the heavier hydrocarbons into lighter hydrocarbons, such lighter oil being fractionally separated as one uninterrupted process, and during such process, passing the released vapors and generated gases through the liquid body, thus reducing the amount of incondensable gases and coke; to provide a method and apparatus in which a series of chambers are employed, and in which the hydrocarbons being treated are subjected to progressively increasing temperatures; to provide a method and apparatus in which the vapors and gases are subjected to progressively decreasing temperatures, the vapors and gases being preferably caused to percolate through the pools of oil in the various chambers, advancing from those having higher temperatures to those wherein lower temperatures are maintained; to provide a method and apparatus wherein the vapors, gases and liquid are brought into intimate contact with each other in zones of reaction; to provide a process and apparatus in which the heavier products of reaction may be withdrawn individually and separately from any of the chambers; to provide a process and apparatus particularly characterized by the maintenance of differential pressures on the chambers whereby the passage of the vapors through successive chambers may be maintained by reducing the pressure on each succeeding chamber so that the final chamber into which the vapors pass, is at a lower pressure than any of the preceding chambers; to provide a process and apparatus wherein the operation described in the preceding object, can be accomplished without the use of vapor pumps; to provide a process and apparatus in which the overflowing oil from one pool to a succeeding pool of higher temperature may have imposed thereon a pressure by means of a pump suitable for overcoming the difference in pressure between the chamber from which it was withdrawn, and the chamber to which it is being passed, and in general to provide improvements in a process and apparatus of the character referred to.

The utility of the invention, as well as other objects and advantages will hereinafter more fully appear.

The single figure is a diagrammatic side elevational view of apparatus in which the invention may be carried out.

Referring in detail to the drawings, 1 designates a charging stock inlet line in which may be interposed the valve 2 and pump 3 adapted to draw charging stock from any suitable source of supply. The pump 3 communicates with a feed line 4, which feed line in turn communicates with the first of a series of serially connected chambers 5, 5a, 5b, 5c and 5d.

The charging stock introduced through the line 4 into the chamber 5 is brought into physical contact with vapors released from a preceding chamber 5a, 5b, etc., as will be hereinafter more particularly described. The chamber 5 is preferably similar to the chambers 5a, 5b, 5c and 5d, and comprises a metal shell which may be provided with suitable insulation to prevent loss of heat by radiation. Each of the chambers 5, 5a, 5b, 5c and 5d is preferably externally unheated, that is, these chambers are not subjected to such heating conditions as would raise the oil passing therethrough to a conversion temperature.

While it may be desirable to subject any of said chambers to such heat as will maintain the temperature to which the oil was raised in the next preceding chamber, it is not contemplated that while the oil is passing through these zones it should be raised to such a temperature as will cause conversion. The unvaporized portion of the charging stock may be removed from chamber 5 through line 6 in which may be interposed a pump 7 and valve 8, which line 6 communicates with chamber 5a. Similar connections communicate between chambers 5a and 5b, and 5b and 5c, which may be designated respectively as follows: A line communicating between chambers 5a and 5b might be designated 6a in which may be interposed pump 7a and valve 8a. The line connecting the chambers 5b and 5c may be identified as 6b in which may be interposed a pump 7b and valve 8b. It is to be particularly noted that in the preferred form of operation, lines 6, 6a and 6b are disposed along the wall of their respective chambers at such a height that they withdraw the unvaporized oil at a point above the point at which the vapors are introduced from a preceding chamber, as will be hereafter described. It may be pointed out here that the purpose of this is to cause the vapors to be introduced below the liquid level of oil in the chamber whereby the vapors percolate up through said pool. I of course, do not wish to limit myself to introduce the oil at any particular point in the height of the chamber, but wish to emphasize that in the preferred form of the invention the liquid drawoff is above the vapor inlet. The unvaporized charging stock passing into and through the pools of oil maintained in the chambers 5, 5a, 5b and 5c respectively, are subjected to progressively increasing temperatures, as will be hereinafter more particularly described. The unvaporized oil from the chamber 5c may be withdrawn through the line 9 in which may be interposed valves 10 and pump 11, the line 9 communicating with the heating tube 12, which may take the form of continuous lengths of connected tubing arranged in the form of a coil as indicated. The coil 12 may be mounted in a conventional type furnace illustrated diagrammatically at 13, which furnace may be heated by means of a burner diagrammatically illustrated at 14. A by-pass 15 controlled by valve 16, may be connected into the line 9 whereby the pump 11 may be by-passed, if found desirable.

The unvaporized oil vaporized from the chamber 5c through the line 9 and passed through the coil 12 will be subjected to heating conditions high enough to raise said oil while passing through the coil to cracking or conversion temperature.

The oil after passing through the coil may be removed through the transfer line 15 in which may be interposed the valve 16 and introduced into the chamber 5d, which chamber 5d may be used as a soaking instrumentality or as a vapor separating zone. If used as a soaking instrumentality, it is desired that the temperature to which the oil was heated in the heating coil be maintained as close as possible thereto so that the oil will be subjected to such temperature for a desired length of time to complete the reaction. In this case, all of the products of reaction may be withdrawn through the line 17 in which may be interposed the valve 18 and passed into the pool of oil maintained in the chamber 5c. In case the chamber 5d is used as a vapor separating means, the separated vapors may pass through the line 19 controlled by valve 20 and the unvaporized liquid passed through the line 17 controlled by the valve 18, both pipes 17 and 19 discharging into the chamber 5c. In any event, separation of vapors will take place in the chamber 5c, said separated vapors passing out of the chamber 5c through the vapor outlet line 21 in which may be interposed the valve 22, the vapor line 21 discharging said vapors into the next succeeding chamber 5b below the liquid level of the oil pool maintained therein. The vapors are thus caused to percolate through the pool of oil, thus scrubbing said vapors and assisting in their fractionation, while at the same time imparting heat to the oil and vaporizing the lighter fractions thereof. This repeated scrubbing of the vapors by causing same to pass through the pools of oil, imparts beneficial characteristics to the product, for instance, one of the desirable characteristics imparted to the final product is that it is easier to subsequently refine.

Vapors remaining uncondensed after passage through the chamber 5b may be withdrawn through the vapor line 21a controlled by valve 22a and discharged below the liquid level of the pool of oil maintained in the next succeeding chamber 5a, where the same relative action takes place as was described for the chamber 5b. The vapors remaining uncondensed after passage through the chamber 5a, may be removed through the vapor line 21b controlled by valve 22b, and may be introduced below the liquid level of the pool of oil maintained in the next succeeding chamber 5, said vapors being caused to percolate through the body of oil in the same manner as described for the chamber 5b.

The vapors remaining uncondensed after passage through the chamber 5 may be removed through the vapor outlet line 21c controlled by valve 22c, condensed in the conventional type condenser coil illustrated diagrammatically at 23 and collected as liquid distillate in the receiver 24, which latter may be provided with the uncondensable gas relief line 25 controlled by valve 26, liquid drawoff line 27 controlled by valve 28. It is obvious of course, that all or regulated portions of the liquid distillate collecting in the receiver 24 may be returned under suitable pump pressure to chamber 5, or to any of the other chambers 5a, 5b, 5c or even 5d for the purpose of assisting in the fractionation of the vapors. Obvious instrumentalities including the return line, vapor pump, etc., may be connected with the receiver 24 for this purpose. Each of the chambers 5, 5a, 5b, 5c and 5d may be provided with an auxiliary drawoff line or drain 29 controlled by valve 30, which preferably connects with the bottom of the chamber for the purpose of withdrawing unvaporized hydrocarbons including solids, semi-solids, semi-liquid and liquid.

The operation of the apparatus described in the foregoing description should be apparent to those skilled in the art. The unvaporized portion of the charging stock is progressively distilled through zones of increasing temperature wherein vapors from preceding zones which are passing in a counter-current direction to the flow of charging stock are brought into physical contact therewith, thus keeping to some extent, an equilibrium between vapors and liquid whereby the heavier or insufficiently converted fractions of the vapors will be condensed and subjected to further treatment, while the sufficiently converted fractions will be passed successively through the various zones to be eventually removed through the vapor line 21c.

As a feature of the invention, the serially sure, that it, the chamber 5d may be maintained under differential conditions of pressure, that is, the chamber 5d may be maintained under a pressure of say 200 pounds more or less, the chamber 5c may be maintained under a pressure of 150 pounds more or less, the chamber 5b under 100 pounds more or less, the chamber 5a under 75 pounds more or less, and the chamber 5 under 50 pounds more or less. By maintaining a gradually decreasing pressure in the direction of the travel of the vapors, it is obvious that the vapors will have an uninterrupted flow after said reduction in pressure, thus eliminating the use of vapor pumps for the purpose of assisting and facilitating the passage of said vapors and the percolation thereof through the oil pools. It is to be understood of course, that these pressures may vary widely and may be materially different from the illustration, without departing from the scope of the invention, for instance, the pressures may range as follows: 150 pounds more or less on chamber 5d; 125 pounds more or less on chamber 5c; 75 pounds more or less on chamber 5b; 50 pounds more or less on chamber 5a, and atmospheric or superatmospheric pressure conditions maintained in chamber 5.

The most desirable pressures to be maintained on the chambers, and the most desirable differential between the different chambers will depend upon the character of oil being treated, the temperature conditions, the type of products desired, etc.

The same qualification holds true for the temperature. The most ideal temperature conditions of the different parts of the apparatus will of course, vary with the character of oil being treated, and the types of products desired.

As an illustration merely, the oil passing through the heating coil 12, may be heated to a temperature of say 850 degrees F. more or less, which temperature undergoes a gradual decrease, which for instance, may result in the following temperature conditions maintained on successive chambers: 650 degrees F. more or less for chamber 5c; 600 degrees F. more or less for chamber 5b; 525 degrees F. more or less for chamber 5a and 450 degrees F. more or less for chamber 5. These temperatures, it is to be understood, are purely illustrative, and are not to be taken in any way as a limitation of the invention. According to the method of cracking to be adopted, whether liquid or vapor phase, the temperature to which the oil is raised while passing through the heating coil 12, will be regulated accordingly. It is obvious of course, that the temperature will be higher for vapor phase cracking than for liquid phase cracking. The vapors liberated in the preceding zone under high pressure will naturally freely flow toward a zone of lower pressure. The use of the pumps 7, 7a, 7b and 11 is therefore necessary in order to restore to the liquid passing successively through the zone of increasing pressure to overcome such pressure.

From the foregoing it will be apparent that the vapors are caused to pass through zones of decreasing temperature and pressure while the unvaporized liquid is caused to pass through zones of progressively increasing temperature and pressure, while at the same time, the vapors are brought into physical contact with the charging stock in the different pools, preferably by causing the vapors to percolate through separated pools of the unvaporized charging stock.

I intentionally do not wish to limit myself to any particular temperatures, pressures or yields, or to any particular type of charging stock, or type of product which may be produced, as they may vary widely within the scope of the invention. Any of the chambers may be cut out of operation, and by-passed in an obvious manner.

It is important to note that the vapors from a preceding chamber are preferably introduced into the liquid body in such a manner as to prevent any severe agitation in that chamber. I also do not wish to limit myself to an operation of the process in the type of structure and associated instrumentalities illustrated in the drawing, as the process is capable of efficient operation in many types of apparatus.

I claim as my invention:

A process for cracking hydrocarbon oil comprising introducing the fresh untreated oil to one end of a series of externally unheated zones, causing the oil to pass successively through said series of unheated zones, maintaining progressively higher pressure on the succeeding zones of the series, taking off unvaporized oil from the last of the zones of the series, subjecting such oil to cracking conditions of temperature and pressure and supplying thereto substantially all the heat for the process exteriorly of said zone, removing heavier constituents therefrom, introducing the heated products of conversion from which the heavier constituents have been removed to the zone of the series from which said unvaporized oil is taken off, causing vapors released from the oil to move through said series of zones countercurrent to the movement of the untreated oil therethrough, effecting a physical commingling of the vapors and oil in each of said zones and removing from the zone of the series to which the fresh oil is supplied such vapors as have escaped condensation, subjecting the same to a final condensation, and collecting the resulting distillate as the ultimate product of the process.

In testimony whereof I affix my signature.

CARBON P. DUBBS.